(12) United States Patent
Danziger et al.

(10) Patent No.: US 11,940,625 B2
(45) Date of Patent: Mar. 26, 2024

(54) LIGHT-GUIDE DISPLAY WITH REFLECTOR

(71) Applicant: Lumus Ltd., Ness Ziona (IL)

(72) Inventors: Yochay Danziger, Kfar Vradim (IL); Ronen Chriki, Ness Ziona (IL); Daniel Michaels, Ramat Gan (IL)

(73) Assignee: Lumus Ltd., Ness Ziona (IL)

( * ) Notice: Subject to any disclaimer, the term of this patent is extended or adjusted under 35 U.S.C. 154(b) by 507 days.

(21) Appl. No.: 17/290,763

(22) PCT Filed: Nov. 10, 2019

(86) PCT No.: PCT/IL2019/051227
§ 371 (c)(1),
(2) Date: May 2, 2021

(87) PCT Pub. No.: WO2020/095311
PCT Pub. Date: May 14, 2020

(65) Prior Publication Data
US 2022/0004001 A1    Jan. 6, 2022

Related U.S. Application Data

(60) Provisional application No. 62/757,198, filed on Nov. 8, 2018.

(51) Int. Cl.
*G02B 27/01*     (2006.01)
*B60K 35/00*     (2006.01)
(Continued)

(52) U.S. Cl.
CPC .......... *G02B 27/0172* (2013.01); *B60K 35/00* (2013.01); *G02B 5/3066* (2013.01);
(Continued)

(58) Field of Classification Search
CPC .. G02B 27/01; G02B 27/017; G02B 27/0101; G02B 27/0172; G02B 2027/013;
(Continued)

(56) References Cited

U.S. PATENT DOCUMENTS 5,430,505 A    7/1995   Katz
5,712,694 A    1/1998   Taira et al.
(Continued)

FOREIGN PATENT DOCUMENTS

CN    103837988    6/2016
JP    04-159503    6/1992
(Continued)

OTHER PUBLICATIONS

Mukawa et al. A full-color eyewear display using planar waveguides with reflection volume holograms. Journal of The Society for Information Display—J Soc Inf Disp. Mar. 17, 2009. 10.1889/JSID17.3.185-187 Mar. 31, 2009 (Mar. 31, 2009) pp. 285-287.
(Continued)

*Primary Examiner* — Sultan Chowdhury
(74) *Attorney, Agent, or Firm* — Rivka Friedman

(57) ABSTRACT

A display includes a light-guide optical element (LOE) (20) and a projector arrangement (10a) for injecting an image into the LOE so as to propagate within the LOE by internal reflection at a pair of major faces. The image is coupled out from the LOE by a coupling-out arrangement, exemplified here as internal partially-reflecting surfaces (22b). The image is coupled out from the LOE in a direction away from the eye of the observer (24b), and a reflector (30) reflects the coupled-out image back through the LOE (32), towards the eye of the observer (26). Reflector (30) is preferably a selective partial reflector, and may be convex to provide a desired apparent image distance.

22 Claims, 14 Drawing Sheets

(51) Int. Cl.
*F21V 8/00* (2006.01)
*G02B 5/30* (2006.01)

(52) U.S. Cl.
CPC ............ *G02B 6/0055* (2013.01); *B60K 35/23* (2024.01); *B60K 2360/23* (2024.01); *B60K 2360/334* (2024.01); *B60K 2360/336* (2024.01); *B60K 2360/347* (2024.01); *G02B 2027/013* (2013.01); *G02B 2027/0178* (2013.01)

(58) Field of Classification Search
CPC .... G02B 2027/0112; G02B 2027/0178; G02B 2027/0185; G02B 6/00; G02B 6/0055; G02B 6/34; G02B 6/3534; G02B 6/29328; B60K 2370/23; B60K 2370/334; B60K 2370/336; B60K 2370/347; B60K 2370/1529
See application file for complete search history.

(56) References Cited

U.S. PATENT DOCUMENTS

| | | | |
|---|---|---|---|
| 6,154,321 A | 11/2000 | Melville et al. | |
| 6,239,092 B1 | 5/2001 | Papasso et al. | |
| 6,264,328 B1 | 7/2001 | Williams | |
| 6,268,883 B1* | 7/2001 | Zehnder | H04N 5/33 348/E5.09 |
| 6,404,550 B1 | 6/2002 | Yajima | |
| 6,542,307 B2 | 4/2003 | Gleckman et al. | |
| 6,671,100 B1 | 12/2003 | McRuer | |
| 6,927,694 B1 | 9/2005 | Smith et al. | |
| 8,187,481 B1 | 5/2012 | Hobbs | |
| 8,294,994 B1* | 10/2012 | Kelly | G02B 27/0172 359/630 |
| 8,472,119 B1 | 6/2013 | Kelly | |
| 8,665,178 B1 | 3/2014 | Wang | |
| 9,348,143 B2 | 5/2016 | Gao et al. | |
| 9,513,479 B2 | 12/2016 | Komatsu et al. | |
| 9,606,354 B2 | 3/2017 | Spitzer et al. | |
| 9,625,723 B2 | 4/2017 | Lou | |
| 9,740,006 B2 | 8/2017 | Gao | |
| 9,798,061 B2 | 10/2017 | Hsiao et al. | |
| 9,927,614 B2 | 3/2018 | Vallius | |
| 10,007,115 B2 | 6/2018 | Greenhalgh et al. | |
| 10,198,865 B2 | 2/2019 | Kezele et al. | |
| 10,222,535 B2 | 3/2019 | Remhof et al. | |
| 10,326,983 B2 | 6/2019 | Hua et al. | |
| 10,345,903 B2 | 9/2019 | Robbins et al. | |
| 10,409,064 B2 | 9/2019 | Hongseok et al. | |
| 10,416,452 B2 | 9/2019 | Cheng et al. | |
| 2003/0165017 A1 | 9/2003 | Amitai | |
| 2004/0032660 A1 | 2/2004 | Amitai | |
| 2004/0033528 A1 | 2/2004 | Amitai | |
| 2005/0024849 A1 | 2/2005 | Parker et al. | |
| 2005/0078388 A1 | 4/2005 | Amitai | |
| 2005/0083592 A1 | 4/2005 | Amitai | |
| 2005/0180687 A1 | 8/2005 | Amitai | |
| 2007/0035706 A1 | 2/2007 | Margulis | |
| 2007/0091445 A1 | 4/2007 | Amitai | |
| 2007/0097513 A1 | 5/2007 | Amitai | |
| 2007/0155277 A1 | 7/2007 | Amitai | |
| 2007/0159673 A1* | 7/2007 | Freeman | G02B 6/0028 359/19 |
| 2007/0165192 A1 | 7/2007 | Prior | |
| 2007/0273611 A1 | 11/2007 | Torch | |
| 2008/0025667 A1 | 1/2008 | Amitai | |
| 2008/0106775 A1 | 5/2008 | Amitai et al. | |
| 2008/0151375 A1 | 6/2008 | Lin | |
| 2008/0151379 A1 | 6/2008 | Amitai | |
| 2008/0186604 A1 | 8/2008 | Amitai | |
| 2008/0198471 A1 | 8/2008 | Amitai | |
| 2008/0278812 A1 | 11/2008 | Amitai | |
| 2008/0285140 A1 | 11/2008 | Amitai | |
| 2009/0052046 A1 | 2/2009 | Amitai | |
| 2009/0052047 A1 | 2/2009 | Amitai | |
| 2009/0097127 A1 | 4/2009 | Amitai | |
| 2009/0122414 A1 | 5/2009 | Amitai | |
| 2009/0153437 A1 | 6/2009 | Aharoni | |
| 2010/0171680 A1 | 7/2010 | Lapidot et al. | |
| 2010/0214635 A1 | 8/2010 | Sasaki et al. | |
| 2011/0096566 A1 | 4/2011 | Tsai et al. | |
| 2011/0109880 A1 | 5/2011 | Nummela | |
| 2012/0120498 A1 | 5/2012 | Harrison et al. | |
| 2012/0127062 A1 | 5/2012 | Zeev et al. | |
| 2012/0179369 A1 | 7/2012 | Lapidot et al. | |
| 2012/0218301 A1 | 8/2012 | Miller | |
| 2013/0002122 A1 | 1/2013 | Bell | |
| 2013/0021226 A1 | 1/2013 | Bell | |
| 2013/0033756 A1* | 2/2013 | Spitzer | G02B 27/0172 359/630 |
| 2013/0012022 A1 | 5/2013 | Cajigas et al. | |
| 2013/0120224 A1 | 5/2013 | Cajigas et al. | |
| 2013/0135749 A1 | 5/2013 | Akutsu et al. | |
| 2013/0208362 A1 | 8/2013 | Bohn et al. | |
| 2013/0229717 A1 | 9/2013 | Amitai | |
| 2013/0276960 A1 | 10/2013 | Amitai | |
| 2013/0279017 A1 | 10/2013 | Amitai | |
| 2014/0118813 A1 | 5/2014 | Amitai et al. | |
| 2014/0118836 A1 | 5/2014 | Amitai et al. | |
| 2014/0118837 A1 | 5/2014 | Amitai et al. | |
| 2014/0126051 A1 | 5/2014 | Amitai et al. | |
| 2014/0126052 A1 | 5/2014 | Amitai et al. | |
| 2014/0126056 A1 | 5/2014 | Amitai et al. | |
| 2014/0126057 A1 | 5/2014 | Amitai et al. | |
| 2014/0126175 A1 | 5/2014 | Amitai et al. | |
| 2014/0019801 A1 | 7/2014 | Lamb et al. | |
| 2015/0138451 A1 | 5/2015 | Amitai | |
| 2015/0182348 A1 | 7/2015 | Siegal et al. | |
| 2015/0198805 A1 | 7/2015 | Mansharof et al. | |
| 2015/0205140 A1 | 7/2015 | Mansharof et al. | |
| 2015/0205141 A1 | 7/2015 | Mansharof et al. | |
| 2015/0277127 A1 | 10/2015 | Amitai | |
| 2015/0289762 A1 | 10/2015 | Popovich et al. | |
| 2015/0293360 A1 | 10/2015 | Amitai | |
| 2016/0116743 A1 | 4/2016 | Amitai | |
| 2016/0170212 A1 | 6/2016 | Amitai | |
| 2016/0170213 A1 | 6/2016 | Amitai | |
| 2016/0170214 A1 | 6/2016 | Amitai | |
| 2016/0187656 A1 | 6/2016 | Amitai | |
| 2016/0198949 A1 | 7/2016 | Spitzer | |
| 2016/0282616 A1* | 9/2016 | Matsushita | G02B 27/0101 |
| 2016/0314564 A1 | 10/2016 | Jones | |
| 2016/0327906 A1 | 11/2016 | Futterer | |
| 2016/0341964 A1 | 11/2016 | Amitai | |
| 2016/0349518 A1 | 12/2016 | Amitai et al. | |
| 2017/0003504 A1 | 1/2017 | Vallius | |
| 2017/0007351 A1* | 1/2017 | Yu | G02B 27/0172 |
| 2017/0045744 A1 | 2/2017 | Amitai | |
| 2017/0052376 A1 | 2/2017 | Amitai | |
| 2017/0052377 A1 | 2/2017 | Amitai | |
| 2017/0122725 A1 | 5/2017 | Yeoh | |
| 2017/0140224 A1* | 5/2017 | Wilson | H04N 5/33 |
| 2017/0227764 A1* | 8/2017 | Kim | G02B 27/0103 |
| 2017/0276947 A1 | 9/2017 | Yokoyama | |
| 2017/0299860 A1 | 10/2017 | Wall et al. | |
| 2017/0336636 A1 | 11/2017 | Amitai et al. | |
| 2017/0353714 A1 | 12/2017 | Poulard et al. | |
| 2017/0357095 A1 | 12/2017 | Amitai | |
| 2017/0363799 A1 | 12/2017 | Ofir et al. | |
| 2018/0039082 A1 | 2/2018 | Amitai | |
| 2018/0067315 A1 | 3/2018 | Amitai et al. | |
| 2018/0101087 A1 | 4/2018 | Shinohara | |
| 2018/0157057 A1 | 6/2018 | Gelberg et al. | |
| 2018/0210202 A1 | 7/2018 | Danziger | |
| 2018/0023177 A1 | 8/2018 | Schuck et al. | |
| 2018/0267317 A1 | 9/2018 | Amitai | |
| 2018/0275384 A1 | 9/2018 | Danziger et al. | |
| 2018/0275409 A1 | 9/2018 | Gao et al. | |
| 2018/0292592 A1 | 10/2018 | Danziger | |
| 2018/0292599 A1 | 10/2018 | Ofir et al. | |
| 2018/0033562 A1 | 11/2018 | Cheng et al. | |
| 2018/0372940 A1 | 12/2018 | Ishil et al. | |

(56) References Cited

U.S. PATENT DOCUMENTS

| | | |
|---|---|---|
| 2018/0373039 A1 | 12/2018 | Amitai |
| 2019/0011710 A1 | 1/2019 | Amitai |
| 2019/0018247 A1 | 1/2019 | Gao et al. |
| 2019/0056600 A1 | 2/2019 | Danziger et al. |
| 2019/0064518 A1 | 2/2019 | Danziger |
| 2019/0008667 A1 | 5/2019 | Sinay et al. |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0212557 A1 | 7/2019 | Waldem et al. |
| 2019/0227215 A1 | 7/2019 | Danziger et al. |
| 2019/0278086 A1 | 9/2019 | Ofir |
| 2019/0285900 A1 | 9/2019 | Amitai |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0033572 A1 | 1/2020 | Danziger et al. |
| 2020/0041713 A1 | 2/2020 | Danziger |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0133008 A1 | 4/2020 | Amitai |
| 2020/0150330 A1 | 5/2020 | Danziger et al. |
| 2020/0183159 A1 | 6/2020 | Danziger |
| 2020/0183170 A1 | 6/2020 | Amitai et al. |
| 2020/0192089 A1 | 6/2020 | Haddick et al. |
| 2020/0200963 A1 | 6/2020 | Eisenfeld et al. |
| 2020/0209667 A1 | 7/2020 | Sharlin et al. |
| 2020/0241308 A1 | 7/2020 | Danziger et al. |
| 2020/0249481 A1 | 8/2020 | Danziger et al. |
| 2020/0278557 A1 | 9/2020 | Greenstein et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292818 A1 | 9/2020 | Amitai et al. |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0099691 A1 | 4/2021 | Danziger |
| 2021/0109351 A1 | 4/2021 | Danziger et al. |
| 2021/0116367 A1 | 4/2021 | Gelberg et al. |
| 2021/0141141 A1 | 5/2021 | Danziger et al. |
| 2021/0149204 A1 | 5/2021 | Amitai et al. |
| 2021/0157150 A1 | 5/2021 | Amitai |
| 2021/0165231 A1 | 6/2021 | Gelberg et al. |
| 2021/0239898 A1 | 8/2021 | Danziger et al. |
| 2021/0271006 A1 | 9/2021 | Ronen et al. |
| 2022/0003914 A1 | 1/2022 | Danziger et al. |
| 2022/0004001 A1 | 1/2022 | Danziger et al. |
| 2022/0004014 A1 | 1/2022 | Ronen et al. |
| 2022/0019018 A1 | 1/2022 | Gilo et al. |
| 2022/0030205 A1 | 1/2022 | Danziger |
| 2022/0057643 A1 | 2/2022 | Eisenfeld et al. |
| 2022/0043269 A1 | 10/2022 | Maziel |
| 2022/0043272 A1 | 10/2022 | Amitai |

FOREIGN PATENT DOCUMENTS

| | | |
|---|---|---|
| JP | H08-070782 | 3/1996 |
| JP | 08-313843 | 11/1996 |
| JP | 1996313843 | 11/1996 |
| JP | 2010044172 | 2/2010 |
| JP | 2012-37761 | 2/2012 |
| JP | 2012-037761 U | 2/2012 |
| JP | 2012-198263 | 10/2012 |
| JP | 2019184920 | 10/2019 |
| WO | 2015012280 | 1/2015 |
| WO | WO2015012280 | 3/2017 |

OTHER PUBLICATIONS

Charles B. Owen et all; "Display-Relative Calibration for Optical See-Through Head-Mounted Displays"; Proceedings of the Third IEEE and ACM International Symposium on Mixed and Augmented Reality, Nov. 2-5, Arlington,VA, USA, IEEE, Piscataway, NJ, USA, Nov. 2, 2004 (Nov. 2, 2004), pp. 70-78,XP058382672.

* cited by examiner

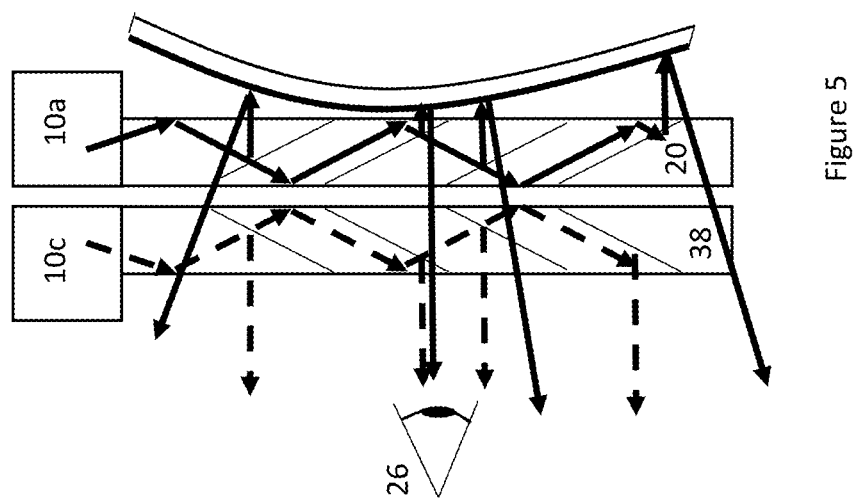

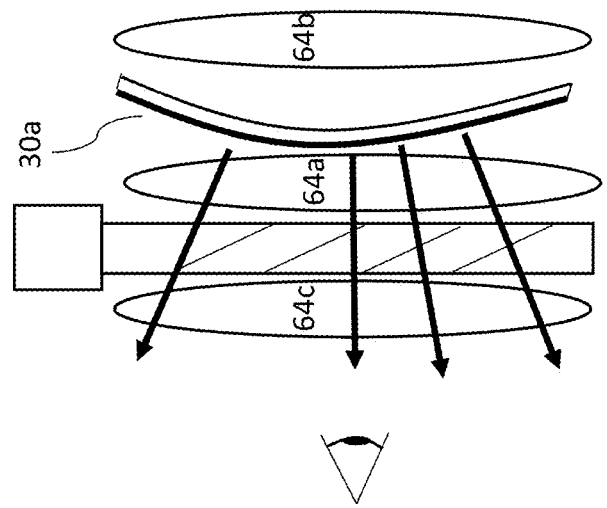
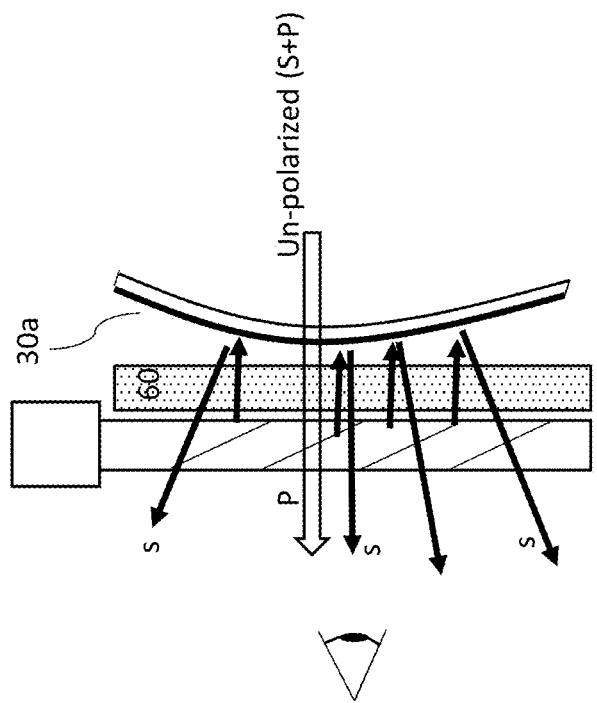

LIGHT-GUIDE DISPLAY WITH REFLECTOR

FIELD AND BACKGROUND OF THE INVENTION

The present invention relates to displays, and in particular, discloses displays in which one or more reflector is employed for directing an image coupled out of a light-guide optical element towards the eye of an observer.

In certain application in which an image is projected from a display towards the eye, such as a near-eye display system, the image should be focused so to appear as if the light rays originated from a near object. However, near-eye display systems that rely on waveguides typically inherently generate collimated images originated at infinity. Refractive lenses may be introduced to implement the required apparent depth.

FIG. 1A shows a basic architecture of a waveguide-based display. Projector 10a injects image light collimated to infinity into a light-guide optical element or "LOE" (interchangeably referred to as a "waveguide") 20 so as to propagate by total internal reflection (TIR) within the waveguide. A coupling-out arrangement is exemplified here by partially reflecting internal surfaces (interchangeably referred to as "facets") 22a within the waveguide oriented at an oblique angle to the major parallel surfaces of the waveguide so as to reflect the light 24a towards the observer's eye 26. Facet reflectivity is typically polarization sensitive and therefore the light 24a is mostly polarized. The ambient light 28 passes through the waveguide and facets with minimal distortion.

FIG. 1B shows a prior art approach to generating a virtual image from a waveguide that appears at a finite distance. The waveguide 20 projects an image collimated to infinity, while lens 21 converts the image to a virtual image at a finite distance. Lens 23 is of opposite optical power relative to 21, so light from the scenery doesn't converge (i.e., maintains its original apparent depth) when passing through the system onto the observer 26. The lenses 21 and 23 can have variable optical power across their surface (i.e., progressive or "variable focus" lenses) thereby generating variable apparent distance of the virtual image. In this example 25 is a nearby virtual image, and 27 is a more distant virtual image. Various configurations based on these principles are disclosed in co-assigned patent application published as WO 2018/138714 A1, which is hereby incorporated herein by reference in its entirety for the purpose of disclosing features and configurations which may be advantageously implemented using the principles described herein below.

Placement of a lens 21 between the waveguide 20 and the observer's eye 26 typically requires the waveguide to be located further from the eye than would otherwise be required, and consequently increases the demands on the dimensions of the waveguide and of the projector for a given field of view.

Coupling light out of the waveguide can be performed by facets (as described in FIG. 1A) or by diffractive gratings. The following description refers by way of non-limiting example only to implementations employing facets for coupling-out of the image, but the invention may equally be implemented using diffractive optical elements for coupling in and/or out of the image, as will be clear to a person ordinarily skilled in the art.

SUMMARY OF THE INVENTION

The present invention is a light-guide display with a reflector.

According to the teachings of an embodiment of the present invention there is provided, a display for displaying an image to an eye of an observer, the display comprising: (a) a light-guide optical element (LOE) having a pair of parallel major faces; (b) a projector arrangement for injecting an image into the LOE so as to propagate within the LOE by internal reflection at the pair of major faces; (c) a coupling-out arrangement for coupling the image out from the LOE in a direction away from the eye of the observer; and (d) a reflector deployed to reflect the coupled-out image back through the LOE towards the eye of the observer.

According to a further feature of an embodiment of the present invention, the reflector is a partially-transparent partial reflector, allowing the observer to view a real scene through the light guide and the partial reflector.

According to a further feature of an embodiment of the present invention, the reflector is a polarization-selective reflector.

According to a further feature of an embodiment of the present invention, the projector arrangement projects the image illuminated by light from at least one laser, the laser having a characteristic wavelength, and wherein the reflector is a chromatically-selective reflector configured to reflect a narrow range of wavelengths including the characteristic wavelength.

According to a further feature of an embodiment of the present invention, the projector arrangement projects the image illuminated by light from at least a first laser, the first laser having a first characteristic wavelength and a second image illuminated by light from at least a second laser, the second laser having a second characteristic wavelength different from the first characteristic wavelength, the first and second characteristic wavelengths corresponding to the same perceived color, and wherein the reflector is a chromatically-selective reflector configured to reflect a narrow range of wavelengths including the first characteristic wavelength while being substantially transparent to the second characteristic wavelength, the display further comprising a second chromatically-selective reflector configured to reflect a narrow range of wavelengths including the second characteristic wavelength, the first and second reflectors being formed with differing curvatures so that the image and the second image are reflected towards the eye of the observer with differing apparent focal distances.

According to a further feature of an embodiment of the present invention, the reflector is a convex reflector.

According to a further feature of an embodiment of the present invention, the convex reflector is a spherical reflector.

According to a further feature of an embodiment of the present invention, the convex reflector is an adjustable-curvature reflector having a curvature that is adjustable in at least one direction.

According to a further feature of an embodiment of the present invention, the convex reflector is a varifocal reflector.

According to a further feature of an embodiment of the present invention, the reflector is a surface integrated with a refractive lens, the refractive lens being configured to provide a refractive vision correction for the observer viewing a scene beyond the refractive lens.

According to a further feature of an embodiment of the present invention, the reflector integrated with the refractive lens is part of a pair of sight-correcting spectacles with side portions for engaging ears of the observer and a bridge portion for engaging a nose of the observer, and wherein the LOE, the projector arrangement and the coupling-out arrangement are implemented as a detachable unit configured for releasable engagement with the sight-correcting spectacles.

According to a further feature of an embodiment of the present invention, there is also provided: (a) a second LOE having a pair of parallel major faces, the second LOE being deployed in overlapping relation with the LOE as viewed along a viewing direction; (b) a second projector arrangement for injecting a second image into the second LOE so as to propagate within the second LOE by internal reflection at the pair of major faces; and (c) a second coupling-out arrangement for coupling the second image out from the second LOE.

According to a further feature of an embodiment of the present invention, the second coupling-out arrangement is configured to couple-out the second image from the second LOE in a direction towards the eye of the observer.

According to a further feature of an embodiment of the present invention, the second coupling-out arrangement is configured to couple-out the second image from the second LOE in a direction away from the eye of the observer, the display further comprising a reflector deployed to reflect the coupled-out second image back through the second LOE towards the eye of the observer, the second reflector having a different curvature from the reflector so that the image and the second image are reflected towards the eye of the observer with differing apparent focal distances.

According to a further feature of an embodiment of the present invention, the reflector and the second reflector are both polarization-selective reflectors.

According to a further feature of an embodiment of the present invention, the second reflector has a polarization reflection axis perpendicular to a polarization reflection axis of the reflector.

According to a further feature of an embodiment of the present invention, the second reflector has a polarization reflection axis parallel to a polarization reflection axis of the reflector, and wherein a halfwave plate is interposed between the second reflector and the LOE.

According to a further feature of an embodiment of the present invention, the coupling-out arrangement comprises a plurality of partially-reflective surfaces deployed within the LOE at an oblique angle to the pair of parallel major faces.

According to a further feature of an embodiment of the present invention, there is also provided a second projector arrangement for injecting a second image into the LOE so as to propagate within the LOE by internal reflection at the pair of major faces in a direction of propagation different from a direction of propagation of the image, the second image being coupled out of the LOE by the partially-reflective surfaces in a direction towards the eye of the observer.

According to a further feature of an embodiment of the present invention, there is also provided a supplementary reflector on a surface of a windscreen of a vehicle, the supplementary reflector being deployed in an optical path between the LOE and the eye of the observer, wherein the supplementary reflector has a non-spherical curvature, and wherein the reflector is implemented with a non-spherical curvature configured to optically compensate for the non-spherical curvature of the supplementary reflector.

There is also provided according to the teachings of an embodiment of the present invention, a display for displaying an image to an eye of an observer, the display comprising: (a) a partial reflector on a surface of a windscreen of a vehicle; and (b) an image projector assembly deployed for projecting image illumination towards the reflector so as to be reflected towards the eye of the observer so as to be viewed by the eye of the observer as an image, wherein the partial reflector is a selective reflector such that a proportion of the image illumination reflected by the partial reflector towards the eye of the observer is greater than a proportion of light from an external scene that is excluded by the partial reflector from passing through the windscreen.

According to a further feature of an embodiment of the present invention, the image illumination projected by the image projector assembly is at least partially polarized, and wherein the partial reflector is a polarization-selective reflector.

According to a further feature of an embodiment of the present invention, the image illumination projected by the image projector assembly is generated by at least one laser having a characteristic wavelength, and wherein the partial reflector is a chromatically-selective reflector configured to reflect a narrow range of wavelengths including the characteristic wavelength.

According to a further feature of an embodiment of the present invention, the image projector assembly comprises: (a) a light-guide optical element (LOE) having a pair of parallel major faces; (b) a projector arrangement for injecting an image into the LOE so as to propagate within the LOE by internal reflection at the pair of major faces; (c) a coupling-out arrangement for coupling the image out from the LOE in a direction away from the partial reflector; and (d) a projector reflector deployed to reflect the coupled-out image back through the LOE towards the partial reflector.

According to a further feature of an embodiment of the present invention, the partial reflector has a non-spherical curvature, and wherein the projector reflector is implemented with a non-spherical curvature configured to optically compensate for the non-spherical curvature of the partial reflector.

BRIEF DESCRIPTION OF THE DRAWINGS

The invention is herein described, by way of example only, with reference to the accompanying drawings, wherein:

FIG. 5 is a schematic side view of a variant implementation of the display of FIG. 4A where each image is conveyed via a separate LOE;

FIG. 9A is a schematic side view of a further variant implementation of the display of FIG. 2 incorporating a liquid crystal adjustable optical element;

FIG. 9B is a schematic side view of a further variant implementation of the display of FIG. 2 illustrating optional positions for incorporating a plurality of additional refractive lenses;

DESCRIPTION OF THE PREFERRED EMBODIMENTS

The present invention is a light-guide display with a reflector.

The principles and operation of displays according to the present invention may be better understood with reference to the drawings and the accompanying description.

Figure 1B:
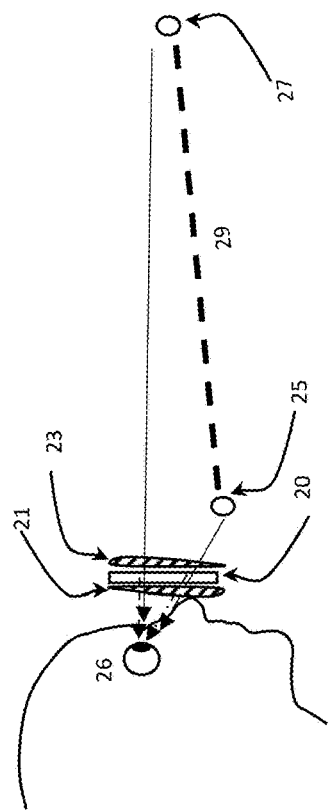
FIG. 1B is a schematic side view, described above, of an augmented reality display with an apparent graduated depth of field, as disclosed in patent publication no. WO 2018/138714 A1.
Figure 1A:
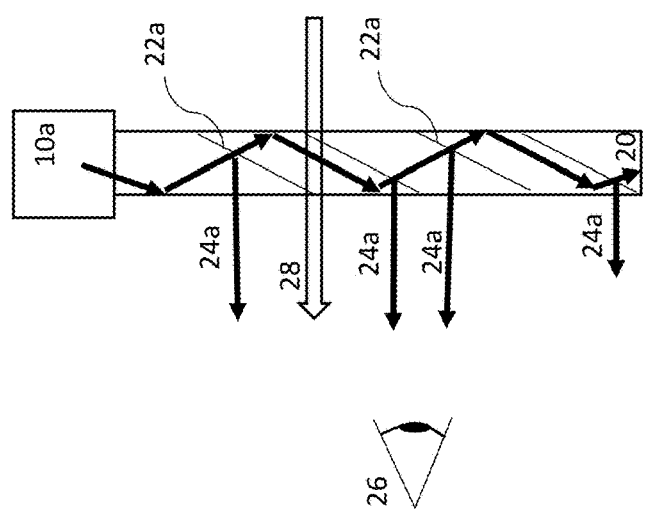
FIG. 1A is a schematic side view, described above, of a conventional augmented reality (AR) display employing a light-guide optical element (LOE)
Figure 2:
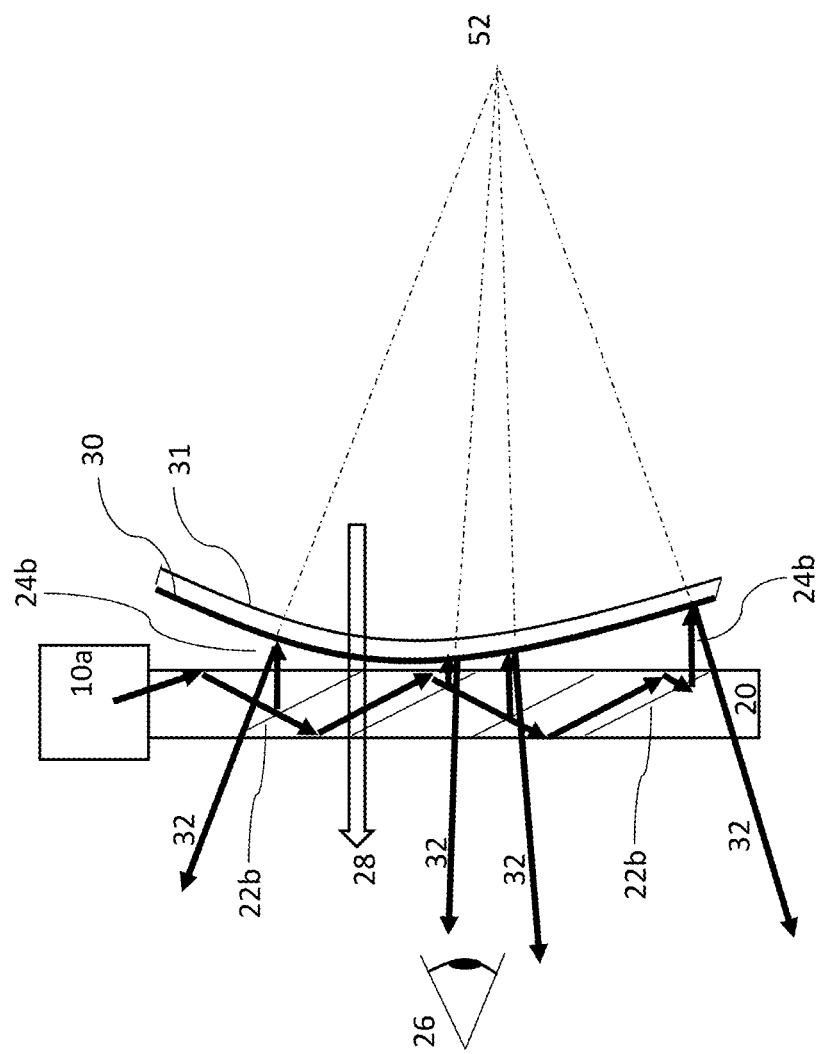
FIG. 2 is a schematic side view of a display, constructed and operative according to the teachings of an embodiment of the present invention, in which an image coupled out from an LOE in a direction away from the observer is reflected back through the LOE and towards the eye of an observer by a reflector.

By way of a general introduction to a first aspect of the present invention, certain embodiments of the present invention as exemplified by FIG. 2 provide a display for displaying an image to an eye of an observer, where the display includes a light-guide optical element (LOE) 20 having a pair of parallel major faces and a projector arrangement 10a for injecting an image into the LOE so as to propagate within the LOE by internal reflection at the pair of major faces. The image is coupled out from the LOE by a coupling-out arrangement, exemplified here as internal partially-reflecting surfaces (or facets) 22b. According to this first aspect of the present invention, the coupling-out arrangement, whether based on reflective facets or diffractive elements, is specifically configured to couple the image out from the LOE in a direction away from the eye of the observer (rays 24b), and a reflector 30 is deployed to reflect the coupled-out image back through the LOE as rays 32, towards the eye of the observer 26.

Use of a reflector 30 on the far side of the LOE 20 to reflect the image back to the observer may provide one or more of a number of significant advantages. Firstly, positioning of the LOE between the eye and the reflector typically facilitates implementations with reduced eye relief, which in turn facilitates reduced size of LOE and projector. Furthermore, the positioning of the reflector opens up new possibilities for rendering images with one or more levels of apparent depth or adjustable apparent image depth, for integration of the device with otherwise conventional sight-correcting spectacles, and facilitates a range of other additional features as will be described further below.

Figure 13:
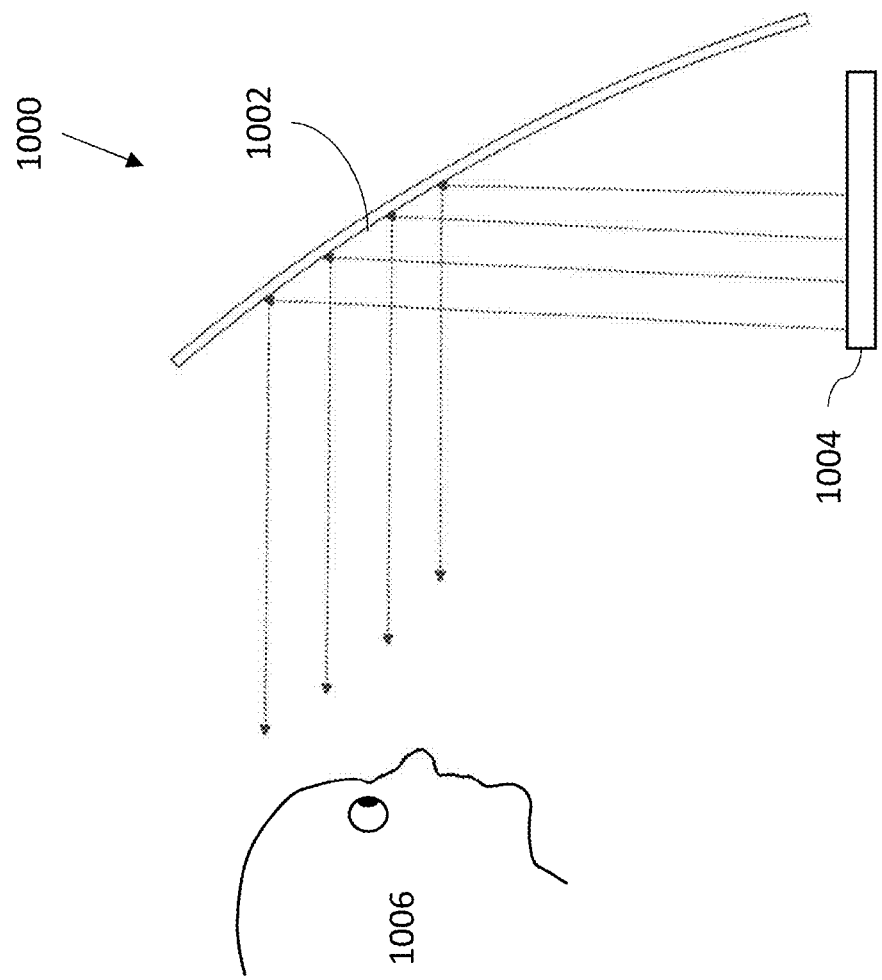
FIG. 13 is a schematic side view illustrating an implementation of an aspect of the present invention in the context of a head-up display (HUD) such as for vehicles.

A second aspect of the present invention is most preferably used in synergy with the above-mentioned display architecture, but is also applicable to a range of other display architectures in which a reflector is interposed in an optical path between an image projector and the observer, such as a head-up display (HUD) configuration. According to this second aspect, the image-combining reflector (e.g., reflector 30 in FIG. 2 or reflector 1002 of FIG. 13) through which the real world is viewed is a selective partial reflector implemented so that a proportion of the image illumination reflected by the partial reflector towards the observer is greater than a proportion of light from an external scene that is excluded by the partial reflector from passing through the reflector. Implementations of this concept are described below based on the use of either a polarization-selective reflector or a chromatically-selective reflector, all as detailed further below.

In FIG. 2 and throughout this document, image projector 10a is represented only schematically as a rectangle. The image projector is preferably configured to generate a collimated image, i.e., in which the light of each image pixel is a parallel beam, collimated to infinity, with an angular direction corresponding to the pixel position. The image illumination thus spans a range of angles corresponding to an angular field of view in two dimensions, all of which should be trapped within the LOE by internal reflection and then coupled out.

Image projector 14a includes at least one light source, typically LEDs or lasers, which may be deployed to illuminate a spatial light modulator, such as an LCOS chip. The spatial light modulator modulates the projected intensity of each pixel of the image, thereby generating an image. Alternatively, the image projector may include a scanning arrangement, typically implemented using a fast-scanning mirror, which scans illumination from a laser light source across an image plane of the projector while the intensity of the beam is varied synchronously with the motion on a pixel-by-pixel basis, thereby projecting a desired intensity for each pixel. In both cases, collimating optics are provided to generate an output projected image which is collimated to infinity. Some or all of the above components are typically arranged on surfaces of one or more polarizing beam-splitter (PBS) cube or other prism arrangement, as is well known in the art.

Optical coupling of image projector 14a to LOE 20 is represented here simplistically by abutment of the components, but is typically actually implemented using a suitable optical coupling, such as for example via a coupling prism with an obliquely angled input surface, or via a reflective coupling arrangement, via a side edge and/or one of the major external surface of the LOE. Details of the coupling-in configuration are not critical to the invention, and are therefore omitted here for conciseness of presentation.

It will be appreciated that the display also includes various additional components, typically including a controller for actuating the image projector, a power supply such as a small onboard battery or some other suitable power source. The controller includes all necessary electronic components such as at least one processor or processing circuitry to drive the image projector, all as is known in the art. Here too, the components are not per se part of the present invention, and are therefore not discussed in detail. Suitable image projectors, often referred to as PODS, are commercially available from various sources.

Referring again to FIG. 2, facets 22b (or a diffractive pattern in case of a diffractive architecture) in waveguide 20 are in this case implemented "facing outward", i.e., oriented so as to reflect the image outwards away from the observer 26. Consequently, the light 24b couples out from the waveguide onto a reflector surface 30. The reflector face is convexly curved, serving as a convex reflective lens; consequently, the out-coupled light 24b that reflects from face 30 diverges as light 32. The diverging light 32 generates a virtual image 52 that appears to be at a desired range (not at infinity). The curvature of the reflector 30 determines the distance of this virtual image according to the normal principles of reflective lenses. The reflector 30 is a partial reflector, so that the ambient light 28 can pass through (with some intensity reduction) and the scenery is visible to the observer 26. The reflecting coating can be a partial reflector or a polarizing reflector (as described further below).

The reflecting coating can alternatively be applied on surface 31 thereby enabling achieving same optical power with reduced curvature since the reflection occurs within a medium with a refractive index significantly higher than air.

Parenthetically, it should be noted that the curvature of surface 30 illustrated in the accompanying drawings is highly exaggerated for illustrative purposes. For typical applications, the range of curvatures required to provide the desired apparent image depths are in the range of 1-8 meters radius of curvature, which corresponds to a barely perceptible deflection of the surface across a lens-sized partial reflector positioned in front of the eyes.

The non-reflecting surface (31 in this example) is preferably designed to introduce minimal distortion the light from the scenery. In most many cases it will have approximately the same shape as 30. The element providing surfaces 30 and 31 may be a thin glass or plastic sheet or lens, or may in some cases be a hollow frame-type support structure for a partially-reflective foil or film.

Figure 3:
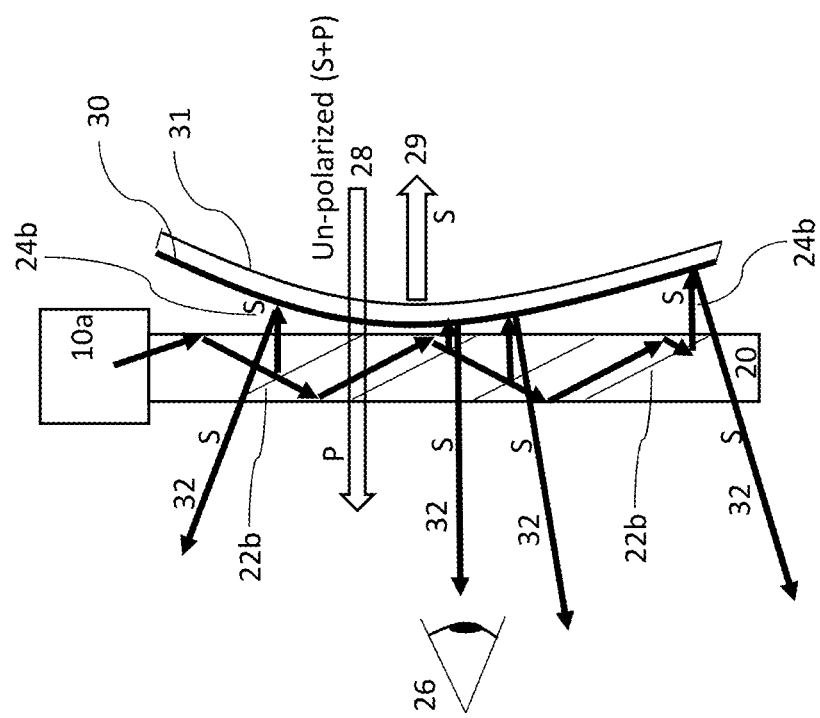
FIG. 3 is a schematic side view of a view similar to FIG. 2 illustrating implementation of the display of FIG. 2 using a polarization-selective reflector.

FIG. 3 shows the same basic architecture as FIG. 2, but with a polarizing reflector surface 30 oriented to reflect S polarization (defined here as parallel to the polarization reflected by the facets 22b) and to transmit P polarization. Such polarizing reflecting coatings (polarizer of perpendicular incidence light) is commercially available from various sources, and can be obtained for example from the 3M Company (USA). Alternatively, a wire-grid film can be used.

The ambient light 28 incident as un-polarized, but S polarization is reflected by reflector 30 as rays 29 while P polarization passes through to the observer. This in itself is beneficial since ambient S-polarized light tends to be scattered by the facets and degrade visibility).

Surface 31 or the underlying sheet/lens can also be implemented as an absorptive polarizer that absorbs S polarization to prevent reflection of S polarized light from the external scene and thereby prevent a "mirror" appearance of the glasses.

The virtual image light 24b coupled out of substrate 20 towards reflector surface 30 is S polarized, and is therefore reflected by surface 30 as illumination 32 towards the observer 26. Use of a polarization-selective reflector 30 that is oriented according the polarization of the image illumination reflected from the facets minimizes the power loss of the virtual image while introducing only 50% loss to the ambient light. This loss can be further reduced by employing a polarization-selective partial reflector for reflector 30 at the expense of reduced reflectivity of the virtual image towards the eye, with a consequent reduction in power efficiency. For example, if reflector 30 reflects 40 percent of the S-polarized light and is substantially transparent to P-polarized light, it will reflect 40% of the image illumination coupled out from the waveguide while only reducing the overall intensity of unpolarized illumination from the outside scene by about 20%. Polarization-selective partial reflectors can be implemented using the same technologies as mentioned above, such as for example a wire-grid film, with suitable choices of wire thickness and spacing.

According to certain particularly preferred implementations, the external faces of waveguide 20 are anti-reflective (AR) coated to suppress multiple undesired reflection of the virtual image.

Although the polarization scheme is not discussed explicitly in certain embodiments described below, it should be appreciated that the polarization management of the implementation of FIG. 3 may be implemented to advantage in each of the variant implementations described herein below.

Figure 4C:
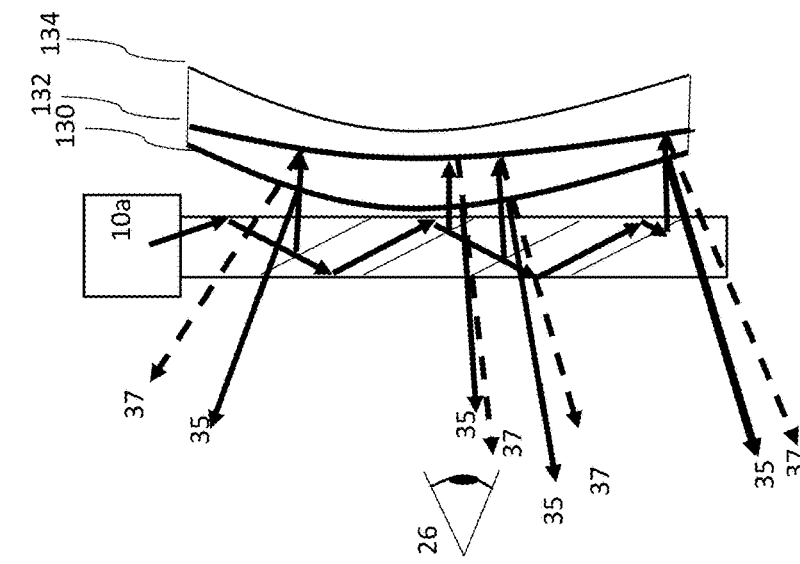
FIG. 4C is a schematic side view of a variant implementation of the display of FIG. 2 employing the two chromatically-selective reflectors to display two images with different apparent distances to the images.
Figure 4B:
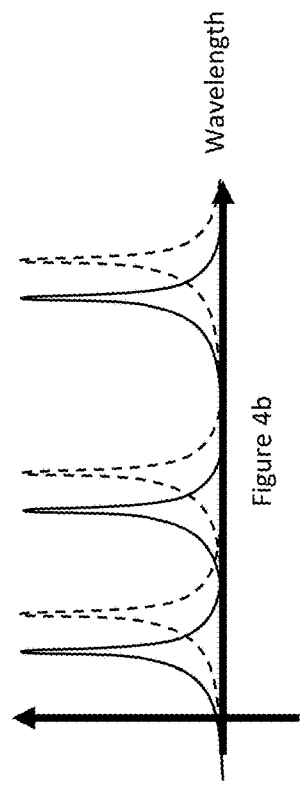
FIG. 4B is a graph illustrating a reflectivity spectrum for two chromatically-selective reflectors according to a variant implementation of the present invention.
Figure 4A:
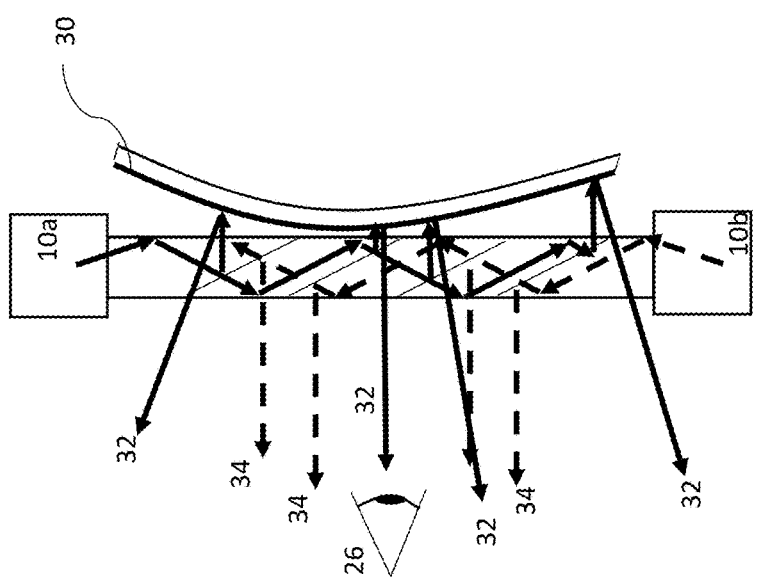
FIG. 4A is a schematic side view of a variant implementation of the display of FIG. 2 employing two projectors to display two images with different apparent distances to the images.

FIG. 4A shows an architecture in which a second projector 10b is introduced on the other side (opposite edge) of the waveguide. The image illumination from this projector (represented schematically by dashed arrows) is reflected by the facets directly towards the eye of the observer 26 as image illumination 34. Therefore, the virtual image from 10b is collimated (focused to infinity) while the virtual image from 10a is at a finite distance defined by the convex reflector. The ability to simultaneously display two images that have no mutual interaction but are located at different apparent distances provides improved perception of depth to the observer.

According to certain implementations of the present invention, a laser light source can be used for image illumination in projector 10, either an illumination source for illuminating the surface of a spatial light modulator or through direct generation of an image by modulation of the laser intensity as a beam is scanned along a scanning pattern. The laser has a narrow spectral width corresponding closely to a characteristic wavelength of the laser. According to certain particularly preferred implementations of the present invention, a chromatically-selective reflector is used that is reflective for a narrow band of wavelengths including the characteristic wavelength(s) of one or more laser used to generate the image, and is transparent to other visible wavelengths. "Narrow band" in this context is used to refer to reflectivity which is localized around the target wavelength so that its impact on the overall intensity transmissivity for broadband white illumination across the visible spectrum corresponds to less than 2% of the overall intensity for each "narrow band", and preferably less than 1% for each band. Additionally or alternatively, the "narrow band" can be characterized in that it has high reflectivity over a wavelength range $\Delta\lambda$ of not more than about 5 nm, and more preferably not more than about 3 nm.

Such a reflector may transmit most of the visible spectrum while not transmitting only the laser light, and has only a small impact on the view of the external scene. Such a reflector can be based on dielectric coatings or on a Bragg hologram (or "thick hologram"). The solid line in FIG. 4B shows a spectrum of such coating that is reflective for three separated wavelengths, effectively being "tuned" to be reflective at the characteristic wavelengths of three lasers (red, green and blue) used to illumination RGB components of an image. The spectral reflectivity of a different coating is marked as dashed line, corresponding to a reflector that is tuned to a different set of wavelengths, displaced in wavelength from the first set of wavelengths, but preferably still in the ranges perceived by a viewer as red, green and blue, suitable for illuminating components of a color image. It is apparent that most of the spectrum is not reflected even if both filters are used in sequence. These filters are used in the architecture described in FIG. 4C.

In FIG. 4C, the projector 10a projects two images using six lasers at different wavelengths according to reflective spectrum of FIG. 4B. Three of the lasers have wavelengths corresponding to the peak reflected wavelengths of the solid-line reflectivity spectrum and another three lasers have wavelengths corresponding to the peak reflected wavelengths of the dashed-line spectrum of FIG. 4B. Two images are injected from projector 10a into the waveguide, each illuminated by RGB illumination from one of the sets of lasers, and both images are coupled out from the waveguide in a direction away from the eye of the observer, as previously described. Surface 130 is coated to exhibit the reflectivity spectrum of the solid line of FIG. 4b as rays 35 while surface 132 is coated to exhibit the reflectivity spectrum of the dashed line of FIG. 4b as rays 37. Since the two reflecting surfaces 130 and 132 have different curvature, they generate two images having different focal distance (apparent depth). This configuration can enable high scenery transmittance because of the high transmittance of rest of spectrum as shown in FIG. 4B.

An alternative implementation of the device of FIG. 4c can include surface 130 as a spectrally-selective reflecting surface with reflectivity according to the solid line of FIG. 4b, as described, and a surface 132 that reflects S polarization, as described above, thereby avoiding the need for two spectrally selective surfaces.

FIG. 5 shows another optional implementation for generating two fields (i.e., two images at different distances). A second projector 10c projects an image (represented schematically by dashed arrows) into a waveguide 38 that is adjacent to waveguide 20, previously described. The coupling-out facets in waveguide 38 are in an opposite orientation to facets in 20, thereby coupling out the image from 10c directly towards the eye of the observer as a virtual image collimated to infinity. This architecture is thus fully equivalent in function to that of FIG. 4, but the separation of the projected images between two different waveguides may, in some cases, provide useful additional flexibility to optimize design parameters for each set of facets.

The curvature of the reflective lens surface may be any desired curvature or, in certain applications, may be flat. In many implementations, a slightly convex spherical surface provides a particularly simple and useful implementation, defining a desired apparent image focal depth. However, non-spherical lenses of various types and properties may also be used to advantage, as will be exemplified by a number of examples below.

Figure 6:
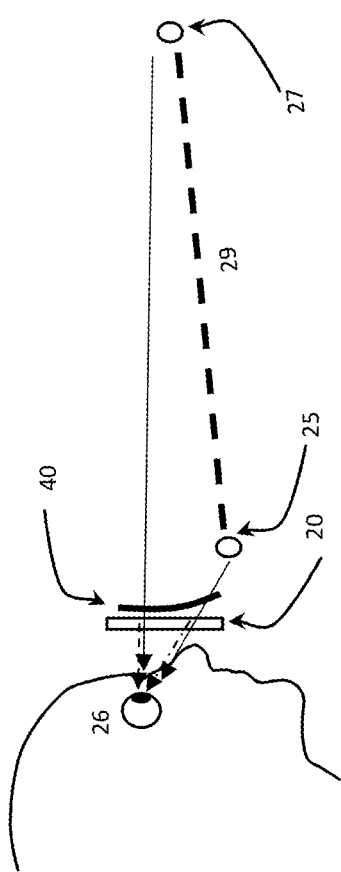
FIG. 6 is a schematic side view of a variant implementation of the display of FIG. 2 employing a variable curvature reflector to provide a display functionally equivalent to the device of FIG. 1B.

FIG. 6 shows an architecture in which a curved reflecting surface 40 (equivalent to 30) has a variable curvature across its length. In this example, the top section has no curvature or very slight curvature, so that virtual image 27 reflected by this section will be located far or at infinity. The lower section has gradually increasing curvature, so that the virtual image 25 at the lower field will appear to be near. Continuous curvature change is preferably used to generate a slanted virtual image plane 29, corresponding to a progressive variation in focal length (or "varifocal" lens). Additional implementations based on the concept of using a (refractive) varifocal lens in the context of a near eye display are presented in the aforementioned WO 2018/138714 A1, which was incorporated herein by reference. Each of those implementations may advantageously and more simply be implemented using a varifocal lens based on reflective optics, according to the teachings of the present invention. Minimal distortions are introduced by plane 40 and its adjacent plane (as by 30 and 31) to the scenery light, and no additional optical component is required to correct for distortion of light from the real scene.

Figure 7B:
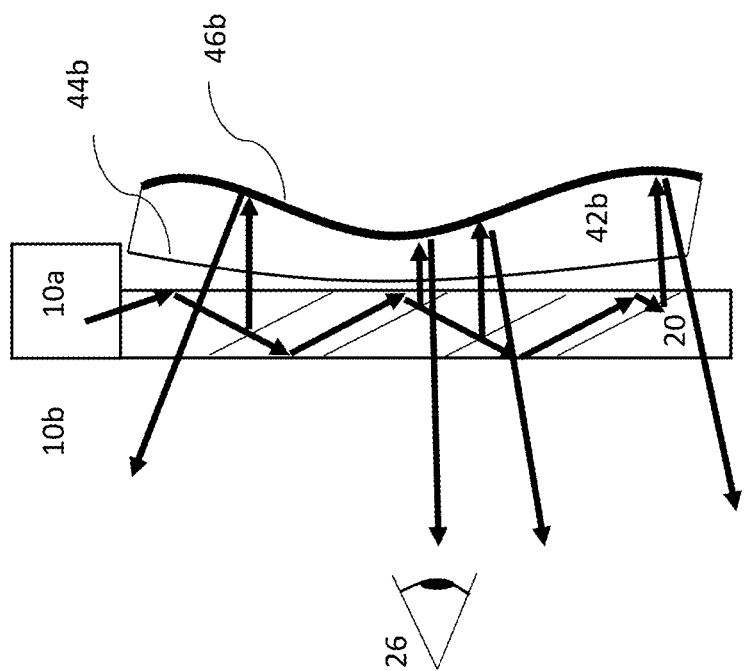
FIGS. 7A and 7B are schematic side views of two further variant implementations of the display of FIG. 2 illustrating integration of the reflector with a front surface and a rear surface, respectively, of a refractive lens.
Figure 7A:
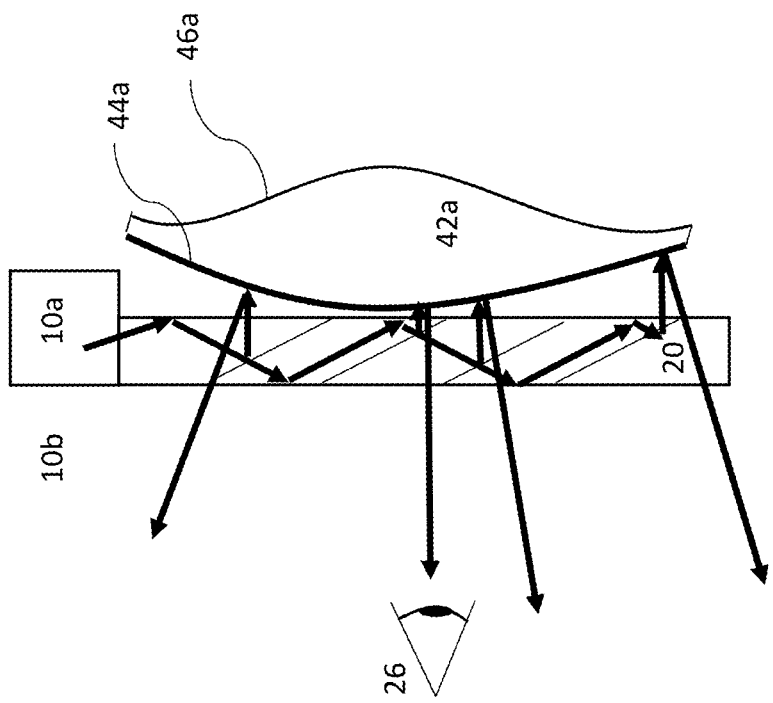

FIG. 7A shows a combination of a refractive lens for viewing the real-world scene with a proximal partially-reflecting surface serving as the reflective lens as described above. If the observer requires prescription spectacles (having focal, cylindrical or progressive parameters), it is beneficial to introduce the prescription optical parameters to a lens 44a placed farther from the waveguide 20, i.e., on the side of the lightguide which is more distant from the eye. The short distance between the eye and the waveguide enables a reduction in waveguide size and results in conservation of illumination power.

In this lens, the reflective surface 44a (equivalent to 30) is designed to reflect the virtual image to the observer having predefined virtual distance and prescribed optical correction. The surface 46a is designed so that the overall effect of the refractive lens 42a is to transmit the scenery without distortions and with prescribed optical parameters. Surface 46a should include the cancellation of any distortions introduced by surface 44a on transmission.

In FIG. 7B there is shown the same architecture as in 7A except that the reflecting surface is in this case the external surface 46b. in this configuration the curvature of the reflector can be reduced (reflection in refractive index instead of air) and an iterative method may be applied to generate the optimal forms of surfaces 44b and 46b.

Figures 7C, 7D:
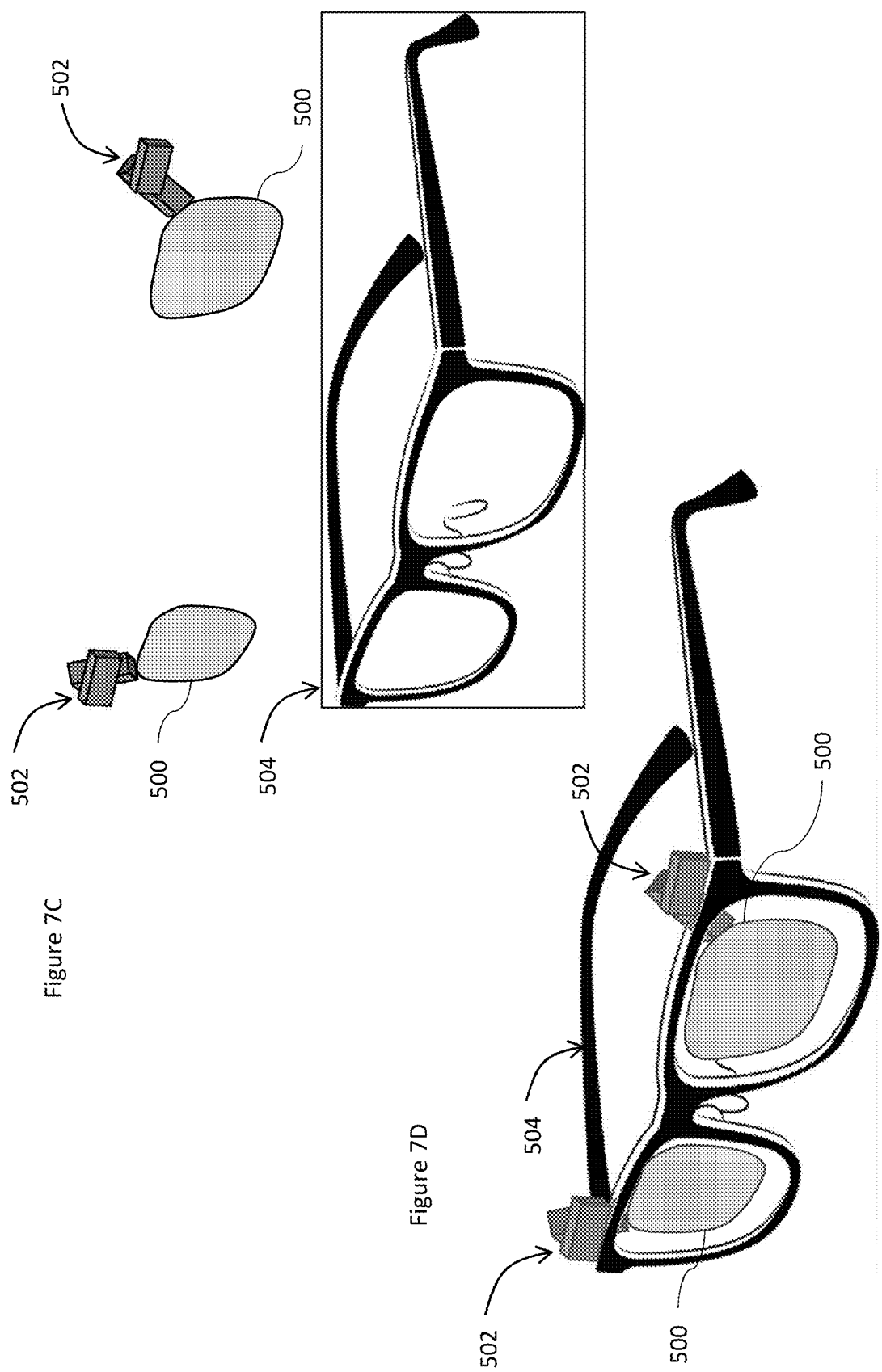
FIGS. 7C and 7D are schematic isometric views of a pair of AR-ready spectacles for use with detachable augmented reality units, shown with the augmented reality units removed and installed, respectively.

FIGS. 7C and 7D show a general view of "AR-ready glasses" 504, which may be used alone as conventional sight-correcting spectacles, but which already include a partial reflector surface formed according to the design considerations defined above in relation to FIG. 7A or 7B. The reflector is thus integrated with refractive lenses as part of the pair of sight-correcting spectacles 504, which include side portions for engaging ears of the observer and a bridge portion for engaging a nose of the observer. The LOE, the projector arrangement and the coupling-out arrangement are implemented together, for one or both eyes, as detachable units (or alternatively a single binocular unit) configured for releasable engagement with sight-correcting spectacles 504. FIG. 7C shows the separated state in which the spectacles 504 can be used separately as conventional sight-correcting spectacles, while FIG. 7D shows the augmented reality (AR)

configuration in which the directly viewed scene can be be augmented with a virtual image from the LOE 500 injected from projector arrangement 502. The LOE is here mounted behind the lens on the side closer to the observer's eye.

Figure 8:
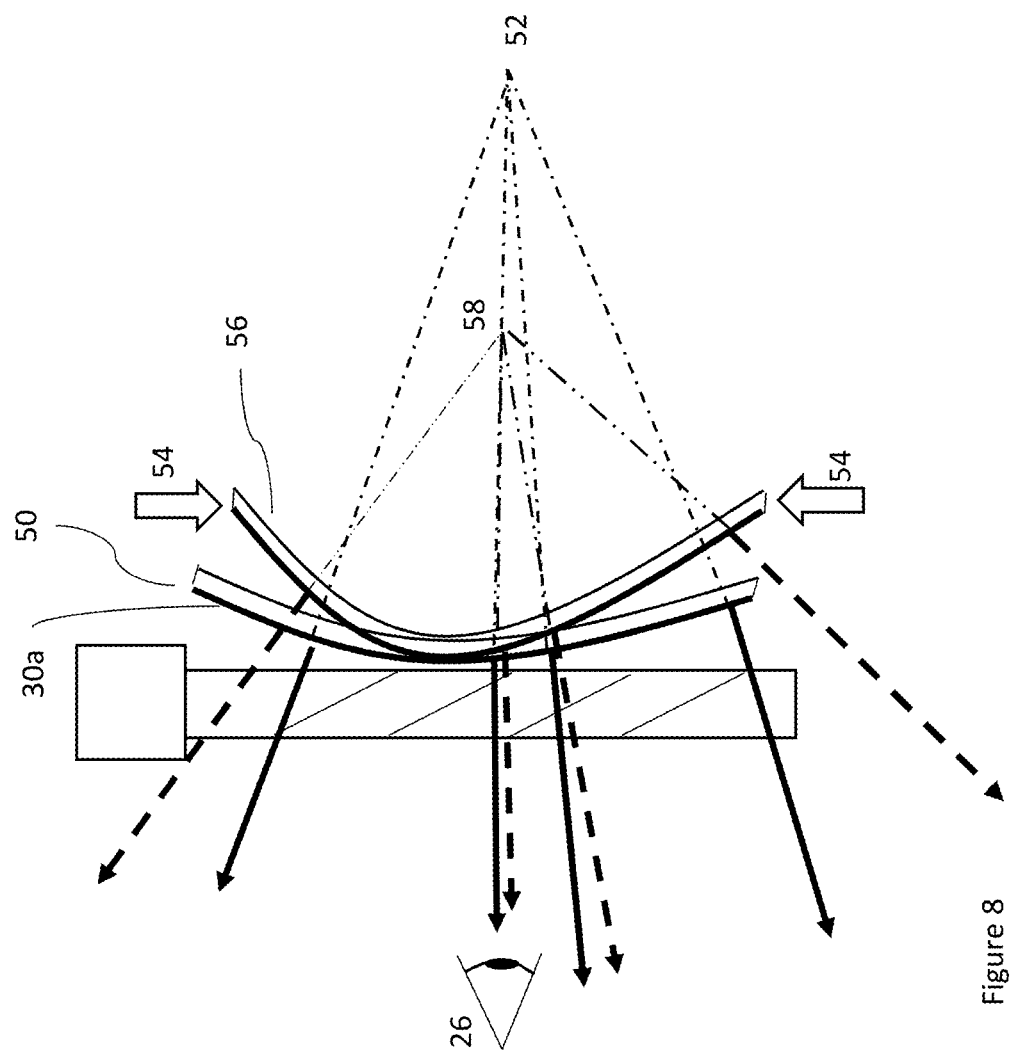
FIG. 8 is a schematic side view of a further variant implementation of the display of FIG. 2 employing a reflector with an adjustably variable curvature.

An adjustable focus depth implementation is shown schematically in FIG. 8. A reflective coating 30*a* is placed on a flexible foil or other flexible substrate 50 (transparent for augmented reality applications, and opaque for virtual reality). At this position (50) the surface 30 generates a virtual image 52 (convergence of dot-dashed lines). By applying force on the foil 54, it changes shape as illustrated at position 56, having a different curvature. At this new curvature, the virtual image is closer 58 (convergence of dot-dot-dash lines). Therefore, by modifying a force 54 applied to the foil, a distance to the virtual image can be adjusted. It will be noted that the change in shape should ideally be performed so as to maintain a desired, typically spherical, reflector form. This can advantageously be achieved using fluid (gas or liquid) pressure to modify the shape of the elements, or by use of electrical capacitance. Mechanical actuation, as illustrated here schematically, may also be used. In practice, the displacements required are typically relatively small (and much smaller than the schematically-illustrated displacement of FIG. 8), and it may not be necessary to accurately preserve spherical geometry since a limited degree of astigmatism can be well tolerated by the eye, particularly when occurring transiently.

FIGS. 9A and 9B show other implementations of the present invention where further optical power is introduced by additional optical elements.

In FIG. 9A, a liquid crystal adjustable optical element (LCAOE) 60 is introduced between the waveguide and 30. When voltage is applied to the LCAOE it changes the optical power of the transmitted s polarization originated from the waveguide. The P polarization from the scenery remain unchanged. The advantage of this configuration (over placing the LCD on other side of the waveguide) is that the light passes twice through the LCAOE 60 thereby doubling its dynamic range. Furthermore, in this configuration the distance between the waveguide and the eye remains minimal enabling smaller waveguide and less illumination power loss. The surface 30 may be curved (as depicted) or can be flat. LCAOE devices suitable for this application are commercially available from Deep Optics Ltd. (Israel) or Himax Technologies, Inc (Taiwan).

FIG. 9B shows a generalized architecture where lenses are implemented between the eye and waveguide 64*c*. Also on both sides of the reflector as 64*b* and 64*a*. In some cases, one or more of these lenses are required in order to achieve optimal image quality with minimal aberrations. Lenses 64*a* and 64*c* can be birefringent in order to obtain different optical power to the scenery and to the virtual image. One of the lenses can be an adjustable lens. As before, surface 30*a* can be flat or curved.

In certain preferred implementations, it is preferable that the faces of the waveguide are coated with anti-reflection (AR) coatings to reduce reflections that might interfere with the nominal image. Furthered reduction of visibility of these reflections can be achieved by using lens 64*c* in this configuration, also optionally provided as an addition to the other configurations described herein. This lens defocuses the reflections from the waveguide surfaces, thereby making them less noticeable.

Figure 10:
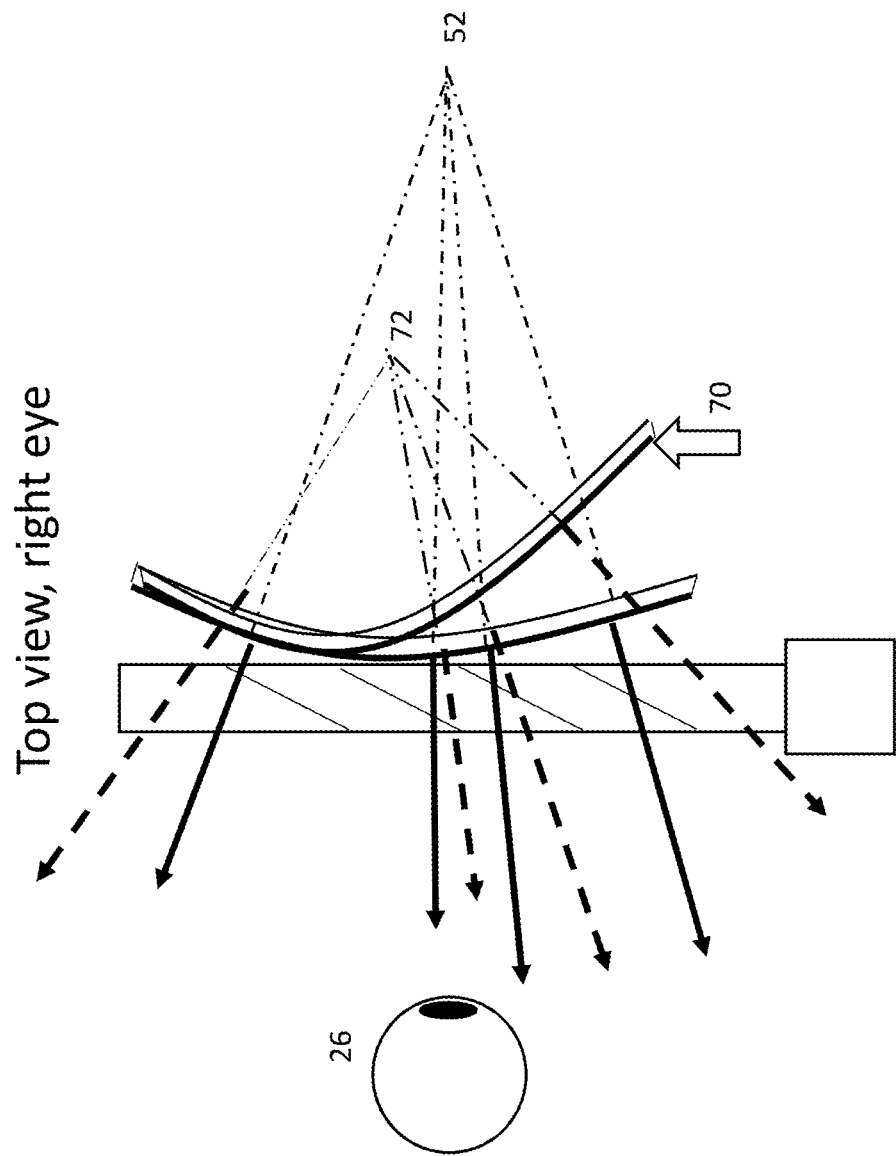
FIG. 10 is a schematic side view of a further variant implementation of the display of FIG. 2 employing a reflector with an asymmetrically adjustably variable curvature.

FIG. 10 is equivalent to FIG. 8, except that in this case, the lens-modifying force 70 is applied asymmetrically, from one side. As a result, the virtual image 72 is not only closer but also shifted (compared to location 58 of FIG. 8). This shift can be used where parallax (convergence) needs to be optically compensated to match the apparent image range. Further fine compensation can be performed electronically by manipulation of the digital image information which is sent to the display.

Figure 11B:
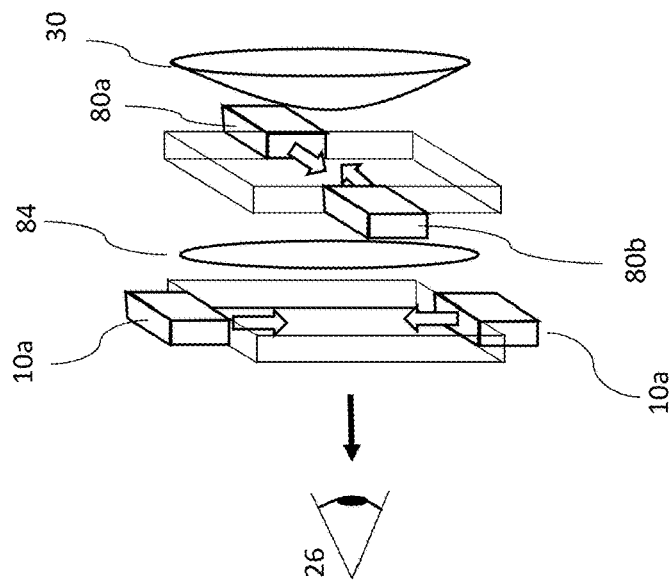
FIG. 11B is a schematic isometric view of a display similar to that of FIG. 11A, but with one subsystem rotated relative to the other in order to avoid the need for a half-lambda wave plate.
Figure 11A:
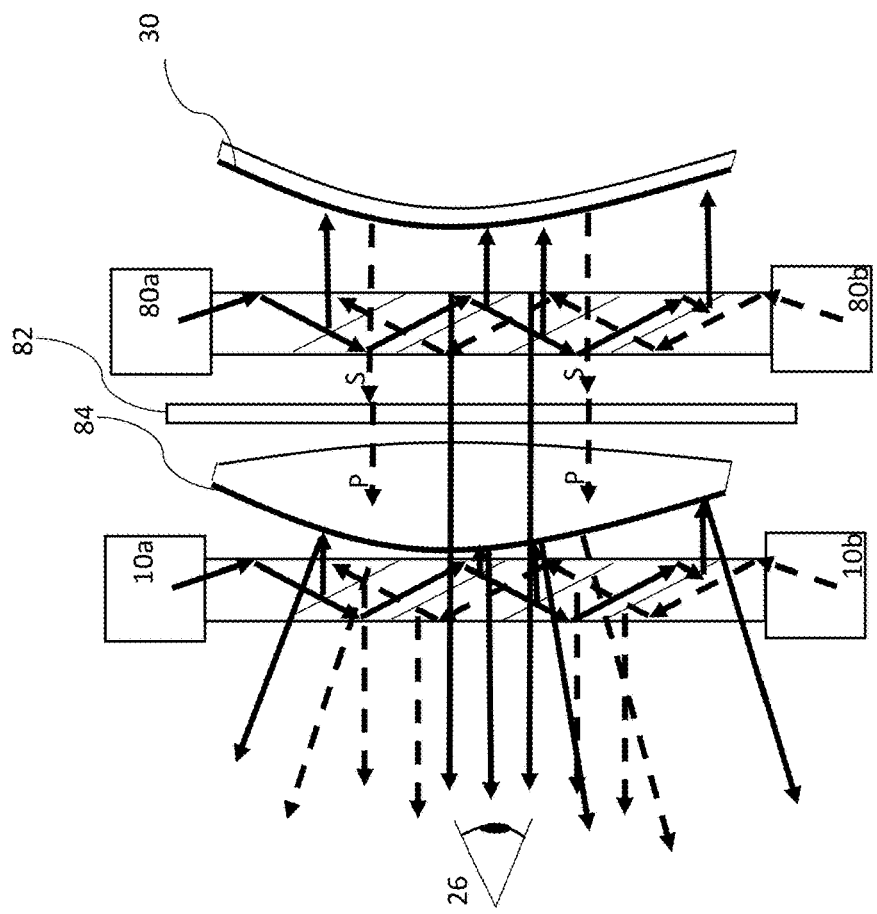
FIG. 11A is a schematic side view of a further variant implementation of the display of FIG. 2 employing a double structure to achieve projection of four images with four distinct apparent distances to those images.

FIG. 11A shows an architecture to generate multiple focal images also referred as a "light-field." Projectors 80*a* and 80*b* project images into a waveguide. The light of these images is out-coupled toward the observer equivalent to the architecture described in FIG. 4A. A half-lambda wave plate 82 rotates the projected light polarization from S to P polarization that pass through reflecting surface 84 (equivalent to 30) towards the observer. Projectors 10*a* and 10*b* together with the associate LOE and reflective surface 84 also function as described above with reference to FIG. 4A. The four images projected by projectors 10*a*, 10*b*, 80*a* and 80*b* thus all reach the eye 26 but each with a different optical power and apparent depth: the image from 10*b* is coupled out as a collimated image appearing at infinity; the image from projector 10*a* is modified only by reflection from surface 84; the image from projector 80*b* is modified by the refractive effects of the lens for which surface 84 forms one surface; and the image from projector 80*a* is modified both by reflection from surface 30 and by the refractive lens. Thus, by suitable choices of the forms of the refractive lens and the two reflective surfaces, it is possible to project a combined virtual image having four different apparent image depths for different components of the combined image.

In a variant but functionally equivalent implementation, wave plate 82 may be omitted and projectors 80*a*, 80*b* with the attached waveguide are rotated at 90 degrees (rotation axis along observer line-of sight). Such a configuration is shown schematically in FIG. 11B.

In the configuration of FIGS. 11A-11B, four focal planes are projected simultaneously from system having a low physical volume. This configuration is most applicable to Virtual Reality (VR). Since the scenery light will have low transmittance to the observer the application to Augmented Reality (AR) could be limited. If the right-most reflector 30 and projector 80*a* are omitted, an AR application with three distinct apparent image depths may be implemented.

Figure 12B:
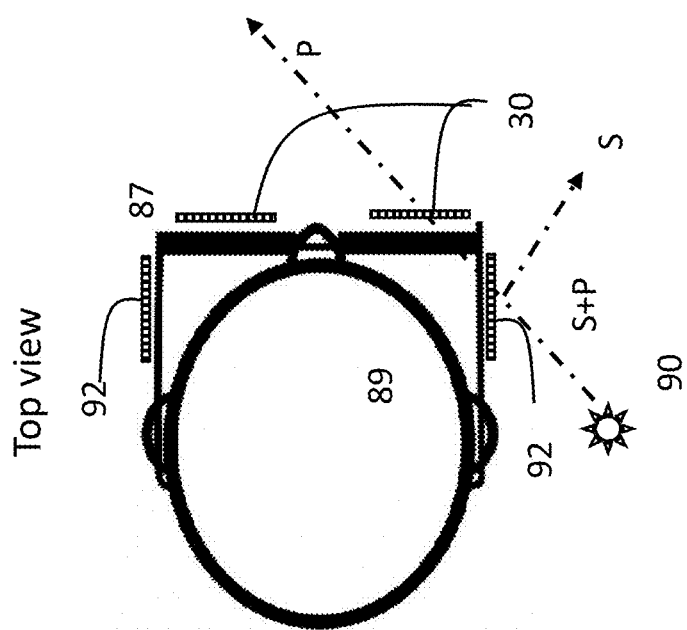
FIG. 12B is a view similar to FIG. 12A indicating how a polarizing filter applied to a lateral region at the sides of the display can be used to eliminate the problematic reflections of FIG. 12A.
Figure 12A:
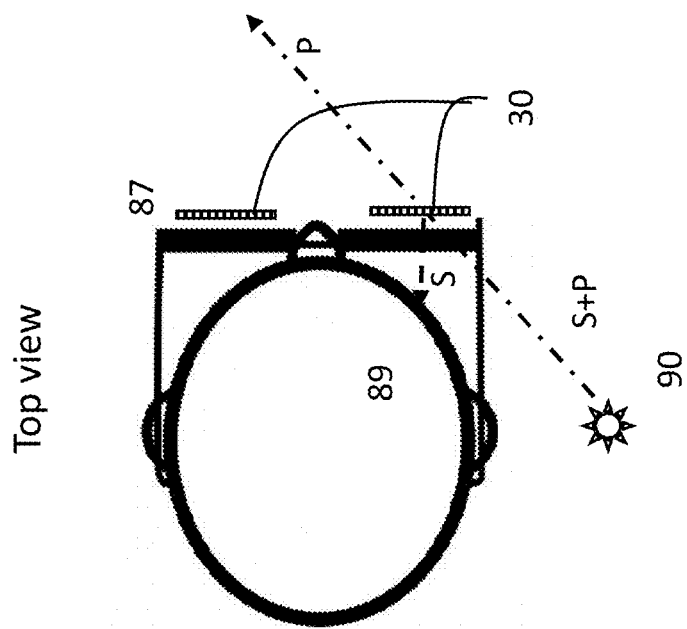
FIG. 12A is a plan view of a near-eye display implemented using two displays similar to FIG. 2 in a head-mounted configuration, and illustrating a possible path of outside illumination which might be reflected towards an eye of the observer.

FIG. 12 shows a schematic top view of near eye display glasses 87 and user 89. Reflecting surface 30 is at the front of the glasses, corresponding to any and all of the embodiments described above. An unpolarized light source from the scenery 90 could illuminate the reflector 30 and in some cases, the S reflections from 30 could illuminate the user's eye and adversely affect visibility.

According to a further aspect of certain preferred implementations of this invention, a transmission polarizer 92 is placed on the side (possible also on top) of the glasses as shown in FIG. 12B. This polarizer 92 has same orientation as the transmission axis of reflecting polarizer 30. Consequently, the transmitted P polarized light through 92 will also transmit through 30 and will not be reflected towards the observer's eye.

Throughout this document, where reference is made to an orientation and/or position of the device of the invention relative to an eye or eyes of an observer, this orientation and/or position is preferably defined by a support arrangement which supports the device relative to the face or head of the observer. This may be a glasses frame form-factor, with contact points at the bridge of the observer's nose and over the ears, or may be based on a head band or on a helmet which grips the head directly, or any other support structure.

In some of the above cases, particularly where the reflective lens is integrated as part of a refractive lens providing a sight correction for the user, the lenses may advantageously be implemented as part of a conventional pair of "AR-ready" glasses (spectacles) which can be used alone, and which can be combined with the additional augmented reality components for use as desired. In such cases, the image projection system and light guide may be mountable to be directly supported by attachment to the glasses, or may be provided with an additional support arrangement as described above.

Although the invention has been illustrated thus far in the context of a preferred but non-limiting example of a near-eye display, it should be noted that embodiments of various aspects of the invention may be used to advantage in other application including, but not limited to, head-up displays (HUDs). One subset of HUDs of particular interest are HUDs for vehicles, where image illumination may be reflected from a partial reflector most preferably implemented on a surface of the vehicle windscreen. An example of such an application is illustrated schematically in FIG. 13, a HUD display 1000 includes a partial reflector 1002 on a surface of a windscreen of a vehicle (not shown), and an image projector assembly 1004 deployed for projecting image illumination towards reflector 1002 so as to be reflected towards the eyes of an observer 1006 so as to be viewed by the observer as an image. The image projector assembly 1004 is represented only schematically, but may be implemented, for example, according to any of the display architectures described above with a rear-side reflector. Where a rear-side reflector (not shown, but equivalent to reflectors 30 or 130 described above) is used, the projector reflector may advantageously be implemented with a non-spherical curvature configured to optically compensate for a non-spherical curvature of the partial reflector 1002. The use of reflective components to provide the required optical power avoids issues of chromatic aberration without unduly complicating the optical arrangements.

According to a further aspect of the present invention, applicable whether in the context of an image projector with a rear reflector as described above or in the context of an otherwise conventional image projector, employs a partial reflector 1002 that is a selective reflector chosen such that a proportion of the image illumination reflected by the partial reflector towards the eye of the observer is greater than a proportion of light from an external scene that is excluded by the partial reflector from passing through the windscreen.

Such selective reflectivity can be achieved in a number of ways, examples of which have already been described above. In one group of implementations of this aspect of the invention, the image illumination projected by the image projector assembly 1004 is at least partially polarized, and the partial reflector 1002 is a polarization-selective reflector. In the previously described implementations, where at least part of the partial reflector was perpendicular to the incident image radiation, polarization selectivity could only be achieved using a structural polarizer reflector. In a case where the image is incident on the partial reflector at an oblique angle, polarization-sensitive reflection can alternatively be achieved by a suitable design of dielectric multilayer coating to generate a polarized beam splitter effect with high reflection of S polarization over the entire angular range of the incident image and low reflectivity of P polarization. If the orientation of the image projector assembly is chosen to provide the output image with S polarization, a high proportion of the image illumination can be reflected while at least half of the unpolarized light from an external scene passes through the partial reflector to reach the eye. If a partially-reflecting beam splitter (e.g., 40% reflector of S polarization and minimal reflection of P polarization) is used, 40% of the projected image intensity may be reflected towards the observer while 80% if the ambient unpolarized illumination is transmitted through the partial reflector with only about 20% being rejected.

According to an alternative approach, also discussed above in the context of FIGS. 4B and 4C, the image illumination projected by the image projector assembly is generated by at least one laser having a characteristic wavelength, and the partial reflector is a chromatically-selective reflector configured to reflect a narrow range of wavelengths including the characteristic wavelength.

It will be appreciated that the above descriptions are intended only to serve as examples, and that many other embodiments are possible within the scope of the present invention as defined in the appended claims.

What is claimed is:

1. A display for displaying an image to an eye of an observer, the display comprising:
   (a) a light-guide optical element (LOE) having a pair of parallel major faces;
   (b) a projector arrangement for injecting an image into said LOE so as to propagate within said LOE by internal reflection at said pair of major faces;
   (c) a coupling-out arrangement comprising a plurality of partially-reflective surfaces deployed within said LOE at an oblique angle to said pair of parallel major faces for coupling the image out from said LOE in a direction away from the eye of the observer; and
   (d) a reflector deployed to reflect the coupled-out image back through the LOE towards the eye of the observer.

2. The display of claim 1, wherein said reflector is a partially-transparent partial reflector, allowing the observer to view a real scene through said light guide and said partial reflector.

3. The display of claim 1, wherein said reflector is a polarization-selective reflector.

4. The display of claim 1, wherein said projector arrangement projects said image illuminated by light from at least one laser, said laser having a characteristic wavelength, and wherein said reflector is a chromatically-selective reflector configured to reflect a narrow range of wavelengths including said characteristic wavelength.

5. The display of claim 1, wherein said image is a first image illuminated by light from at least a first laser, said first laser having a first characteristic wavelength, and wherein said projector arrangement also projects a second image illuminated by light from at least a second laser, said second laser having a second characteristic wavelength different from said first characteristic wavelength, said first and second characteristic wavelengths corresponding to the same perceived color, and wherein said reflector is a first chromatically-selective reflector configured to reflect a narrow range of wavelengths including said first characteristic wavelength while being substantially transparent to said second characteristic wavelength, the display further comprising a second chromatically-selective reflector configured to reflect a narrow range of wavelengths including said second characteristic wavelength, said second chromatically-selective reflector being deployed further from the eye of the observer than said first chromatically-selective reflector to reflect the coupled-out second image back through the LOE towards the eye of the observer, said first and second chromatically-selective reflectors being formed with differing curvatures so that said image and said second image are reflected towards the eye of the observer with differing apparent focal distances.

6. The display of claim 1, wherein said reflector is a convex reflector.

7. The display of claim 6, wherein said convex reflector is a spherical reflector.

8. The display of claim 6, wherein said convex reflector is an adjustable-curvature reflector having a curvature that is adjustable to provide an adjustable perceived distance of the image.

9. The display of claim 6, wherein said convex reflector is a reflector having a progressive variation in focal length.

10. The display of claim 1, wherein said reflector is a partially-transparent partial reflector, allowing the observer to view a real scene through said light guide and said partial reflector, and wherein said partial reflector is integrated with a refractive lens, said refractive lens being configured to provide a refractive vision correction for the observer viewing the real scene beyond said refractive lens.

11. The display of claim 10, wherein said reflector integrated with said refractive lens is part of a pair of sight-correcting spectacles with side portions for engaging ears of the observer and a bridge portion for engaging a nose of the observer, and wherein said LOE, said projector arrangement and said coupling-out arrangement are implemented as a detachable unit configured for releasable engagement with said sight-correcting spectacles.

12. The display of claim 1, further comprising:
(a) a second LOE having a pair of parallel major faces, said second LOE being deployed in overlapping relation with said LOE as viewed along a viewing direction;
(b) a second projector arrangement for injecting a second image into said second LOE so as to propagate within said second LOE by internal reflection at said pair of major faces; and
(c) a second coupling-out arrangement for coupling the second image out from said second LOE.

13. The display of claim 12, wherein said second coupling-out arrangement is configured to couple-out the second image from said second LOE in a direction towards the eye of the observer.

14. The display of claim 12, wherein said second coupling-out arrangement is configured to couple-out the second image from said second LOE in a direction away from the eye of the observer, the display further comprising a reflector deployed to reflect the coupled-out second image back through the second LOE towards the eye of the observer, said second reflector having a different curvature from said reflector so that said image and said second image are reflected towards the eye of the observer with differing apparent focal distances.

15. The display of claim 14, wherein said reflector and said second reflector are both polarization-selective reflectors.

16. The display of claim 15, wherein said second reflector has a polarization reflection axis perpendicular to a polarization reflection axis of said reflector.

17. The display of claim 15, wherein said second reflector has a polarization reflection axis parallel to a polarization reflection axis of said reflector, and wherein a halfwave plate is interposed between said second reflector and said LOE.

18. The display of claim 1, further comprising a second projector arrangement for injecting a second image into said LOE so as to propagate within said LOE by internal reflection at said pair of major faces in a direction of propagation different from a direction of propagation of said image, said second image being coupled out of said LOE by said partially-reflective surfaces in a direction towards the eye of the observer.

19. The display of claim 1, wherein said reflector is a first non-planar reflector, the display further comprising a supplementary reflector on a surface of a windscreen of a vehicle, said supplementary reflector being deployed in an optical path between said LOE and the eye of the observer, wherein said supplementary reflector has a non-spherical curvature conforming to said surface of said windscreen, and wherein said first non-planar reflector is implemented with a corrective non-spherical curvature configured to optically compensate for said non-spherical curvature of said supplementary reflector.

20. A display for displaying an image to an eye of an observer, the display comprising:
(a) a partial reflector on a surface of a windscreen of a vehicle;
(b) an image projector assembly deployed for projecting image illumination towards said reflector so as to be reflected towards the eye of the observer so as to be viewed by the eye of the observer as an image,
wherein said partial reflector is a selective reflector such that a proportion of said image illumination reflected by said partial reflector towards the eye of the observer is greater than a proportion of light from an external scene that is excluded by said partial reflector from passing through said windscreen,
and wherein said image illumination projected by said image projector assembly is at least partially polarized, and wherein said partial reflector is a polarization-selective reflector.

21. A display for displaying an image to an eye of an observer, the display comprising:
(a) a partial reflector on a surface of a windscreen of a vehicle;
(b) an image projector assembly deployed for projecting image illumination towards said reflector so as to be reflected towards the eye of the observer so as to be viewed by the eye of the observer as an image, said image projector assembly comprising:
(i) a light-guide optical element (LOE) having a pair of parallel major faces;
(ii) a projector arrangement for injecting an image into said LOE so as to propagate within said LOE by internal reflection at said pair of major faces;
(iii) a coupling-out arrangement for coupling the image out from said LOE in a direction away from said partial reflector; and
(iv) a projector reflector deployed to reflect the coupled-out image back through the LOE towards the partial reflector,
and wherein said partial reflector is a selective reflector such that a proportion of said image illumination reflected by said partial reflector towards the eye of the observer is greater than a proportion of light from an external scene that is excluded by said partial reflector from passing through said windscreen.

22. The display of claim 21, wherein said partial reflector has a non-spherical curvature, and wherein said projector reflector is implemented with a non-spherical curvature configured to optically compensate for said non-spherical curvature of said partial reflector.

* * * * *